(12) United States Patent
Tseng et al.

(10) Patent No.: US 10,817,015 B2
(45) Date of Patent: Oct. 27, 2020

(54) DISPLAY DEVICE AND METHOD FOR OPERATING DISPLAY DEVICE

(71) Applicant: AmTRAN Technology Co., Ltd., New Taipei (TW)

(72) Inventors: Chiung-Wen Tseng, New Taipei (TW); Min-Cheng Wu, New Taipei (TW); Yi-Xuan Huang, Yilan County (TW)

(73) Assignee: AMTRAN TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/355,836

(22) Filed: Mar. 17, 2019

(65) Prior Publication Data

US 2019/0302838 A1 Oct. 3, 2019

(30) Foreign Application Priority Data

Mar. 30, 2018 (TW) .............................. 107111373 A

(51) Int. Cl.
| | |
|---|---|
| *G06F 1/16* | (2006.01) |
| *H04R 1/40* | (2006.01) |
| *H04N 21/485* | (2011.01) |
| *H04B 1/38* | (2015.01) |
| *H04R 1/02* | (2006.01) |

(52) U.S. Cl.
CPC .......... *G06F 1/1605* (2013.01); *G06F 1/1688* (2013.01); *H04B 1/38* (2013.01); *H04R 1/028* (2013.01)

(58) Field of Classification Search
CPC ..... G06F 1/1605; G06F 1/1688; H04R 1/028; H04B 1/38; H04B 1/3827
See application file for complete search history.

(56) References Cited

U.S. PATENT DOCUMENTS

| | | | |
|---|---|---|---|
| 2012/0020486 A1* | 1/2012 | Fried | H03G 3/32 381/58 |
| 2013/0024018 A1* | 1/2013 | Chang | G08C 17/02 700/94 |
| 2016/0103653 A1* | 4/2016 | Jang | G06F 3/165 381/107 |

FOREIGN PATENT DOCUMENTS

| | | |
|---|---|---|
| CN | 101742138 A | 6/2010 |
| CN | 102761721 A | 10/2012 |
| CN | 105430493 A | 3/2016 |
| JP | 2005-341245 | * 12/2005 |
| TW | 200929861 A | 7/2009 |

OTHER PUBLICATIONS

Machine Translation of JP 2005-341245, 20 pages (Year: 2005).*

* cited by examiner

*Primary Examiner* — Ping Lee
(74) *Attorney, Agent, or Firm* — CKC & Partners Co., LLC

(57) ABSTRACT

A display device includes at least one speaker, a signal transceiver and a processor. The at least one speaker outputs a sound according to a volume parameter. The signal transceiver receives incoming call information from a communication device. The processor is electrically coupled to the at least one speaker and the signal transceiver. The processor detects signal strength of the communication device and adjusts the volume parameter according to the incoming call information and the signal strength, in order to increase or decrease a volume of the sound.

7 Claims, 2 Drawing Sheets

DISPLAY DEVICE AND METHOD FOR OPERATING DISPLAY DEVICE

CROSS-REFERENCE TO RELATED APPLICATION

This application claims priority to Taiwan Application Serial Number 107111373, filed on Mar. 30, 2018, which is herein incorporated by reference.

BACKGROUND

Technical Field

Present disclosure relates to a display device and an operating method thereof. More particularly, present disclosure relates to a display device outputting adjustable volume of sounds and a method for operating such display device.

Description of Related Art

In modern society, people cannot live without televisions and cellphones. However, to enjoy television shows at home, users usually turn the sound volume of the television to higher levels. Under this circumstance, when cellphone(s) of the users receives calls, a conflict between the sound of the television and the sound of the cellphone may occur, resulting in missing some important calls. Sometimes, when the users try to pick up the call without turning off the television, the users need to find the controller of the television to turn down the volume, or to leave the room where the television is located. When the users go back to the television, the users have to turn the volume up accordingly.

SUMMARY

An embodiment of present disclosure is to provide a display device. The display device comprises at least one speaker, a signal transceiver and a processor. The at least one speaker is configured to output a sound according to a volume parameter. The signal transceiver is configured to receive incoming-call trigger information from a communication device. The processor is electrically coupled to the at least one speaker and the signal transceiver. The processor is configured to detect wireless signal strength of the communication device via the signal transceiver and to adjust the volume parameter according to the incoming-call trigger information and the wireless signal strength, in order to adjust a volume of the sound.

Another embodiment of present disclosure is to provide a display device operating method. The display device operating method is to operate a display device. The display device comprises at least one speaker, a signal transceiver and a processor. The display device operating method comprises: outputting, via the at least one speaker, a sound according to a volume parameter; receiving, via the signal transceiver, incoming-call trigger information from a communication device; detecting, via the processor, a wireless signal strength of the communication device; and adjusting, via the processor, the volume parameter according to the incoming-call trigger information and the wireless signal strength, in order to adjust a volume of the sound.

According to above, the embodiments of present disclosure provide the display device and the display device operating method to solve a conflict between the volume of the television and the sound of the phone call (or the phone ring).

DETAILED DESCRIPTION

Figure 1:
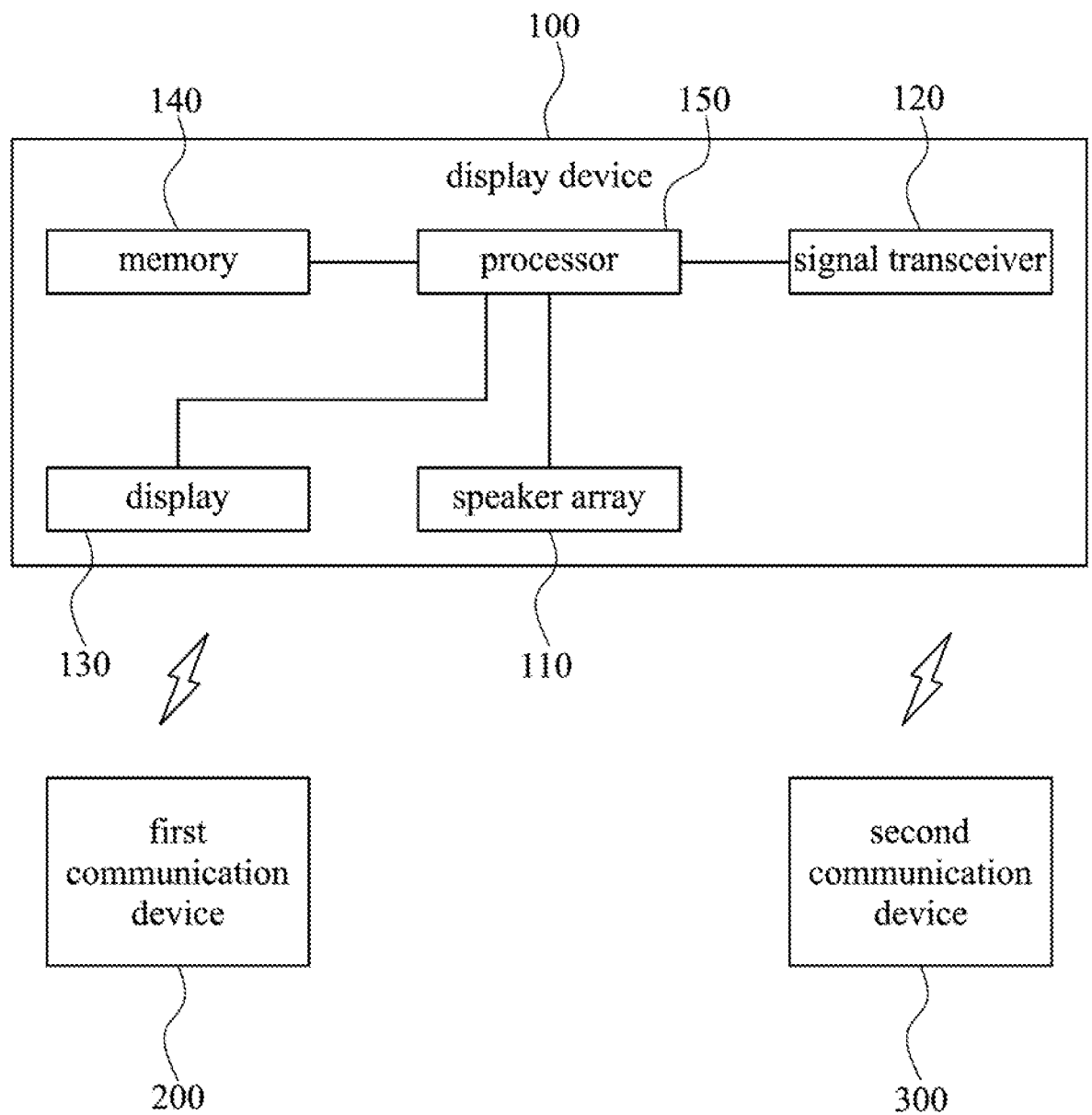
FIG. 1 is a schematic diagram showing a display device according to an embodiment of present disclosure.

Reference will now be made in detail to the present embodiments of the disclosure, examples of which are illustrated in the accompanying drawings. Wherever possible, the same reference numbers are used in the drawings and the description to refer to the same or like parts.

The terminology used herein is for the purpose of describing particular embodiments only and is not intended to be limiting of the disclosure. As used herein, the singular forms "a", "an", and "the" are intended to include the plural forms as well, unless the context clearly indicates otherwise.

It will be understood that, although the terms "first," "second," etc., may be used herein to describe various elements, these elements should not be limited by these terms. These terms are used to distinguish one element from another.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

As used herein, the term "and/or" includes any and all combinations of one or more of the associated listed items.

Furthermore, relative terms, such as "upper" or "top", "lower" or "bottom", "left", "right", "front" or "rear" may be used herein to describe one element's relationship to another element as illustrated in the Figures. It will be understood that relative terms are to describe various elements, and these elements should not be limited by these terms.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

FIG. 1 is a schematic diagram showing a display device 100 according to one embodiment of present disclosure. As shown in FIG. 1, in the embodiment, the display device 100 includes a speaker array 110, a signal transceiver 120, a display 130, a memory 140 and a processor 150. In the figure, the speaker array 110, the signal transceiver 120, the display 130 and the memory 140 are electrically coupled to the processor 150 respectively to receive signals from the processor 150, in order to perform corresponding operations.

In some embodiments, the display device 100 is a television that can communicate with some communication devices or communication base stations.

In the embodiment, the speaker array 110 includes multiple speakers, in order provide decent sound effects to a user when the user is watching videos or listening to music. However, in some other embodiments, the speaker array 110 can be a single speaker.

In the embodiment, the display device 100 can be communicatively coupled to a first communication device 200 and a second communication device 300. In the embodiment, the first communication device 200 and the second communication device 300 can be a mobile phone or a tablet. It is noted that the first communication device 200 and the second communication device 300 have a function of establishing audio connection and video connection via telecommunication service or network service. In some other embodiments, the first communication device 200 and the second communication device 300 have a function of wirelessly accessing Internet via telecommunication service or network service.

In the embodiment, the speaker array 110 can be controlled by the processor 150. The speaker array 110 is configured to receive an audio signal sending from the processor 150, and convert the same to a soundwave according to a volume parameter sending from the processor 150. The speaker array 110 can emit the soundwave towards at least one orientation. The speaker array 110 can be an integration of at least one speaker. The at least one speaker can be the same type but not limited thereto. In the embodiment, the at least one speaker can be different types of speakers being configured to emit soundwaves in different frequencies. It is noted that, in the embodiment, these speakers in the speaker array 110 can be distributed on various locations at the display device 100. When the speaker array 110 emits soundwaves, the soundwaves can be properly transmitted or reflected in the space where the display device 100 is disposed. With this configuration, users of the display device 100 can get better audio experiences.

In the embodiment, the signal transceiver 120 can be a radio frequency signal transceiver. The signal transceiver 120 can include an antenna configured to receive or emit radio frequency signals, an intermediate frequency processor configured to convert frequencies, or a baseband processor configured to process baseband signals. It is noted that, in the embodiment, the first communication device 200 and the second communication device 300 are communicatively coupled to the display device 100 via the signal transceiver 120. With the signal transceiver 120, the display device 100 can exchange signals with the first communication device 200 and the second communication device 300.

In the embodiment, the display 130 can be a liquid crystal display, a light emitting diode display, or the like. The display 130 can be controlled by the processor 150. The display 130 is configured to receive a video signal sending from the processor 150 and to display an image corresponding to the video signal. It is noted that, in general cases, the video signal sending from the processor 150 matches to the audio signal. Therefore, when the display 130 shows the image, the speaker array 110 can send out the soundwave corresponding to the image. In this way, the display device 100 can synchronize the audio and the video to provide the user with better experiences.

In the embodiment, the memory 140 can be an integration of multiple memory units. The memory units include non-volatile memories and volatile memories. The memory 140 is configured to store a plurality of programmed instructions. The processor 150 can access the plurality of programmed instructions to perform some applications defined by these programmed instructions. In some embodiments, the memory 140 is also configured to store information sending from the processor 150.

In the embodiment, the processor 150 can be a single processor or an integration of multiple microprocessors. The processor 150 can be electrically coupled to the memory 140 via some mediums such as buses. As mentioned, the processor 150 is configured to access the instructions from the memory 140 and to perform the applications according to the instructions. For better understandings, the applications are described in following paragraphs.

Figure 2:
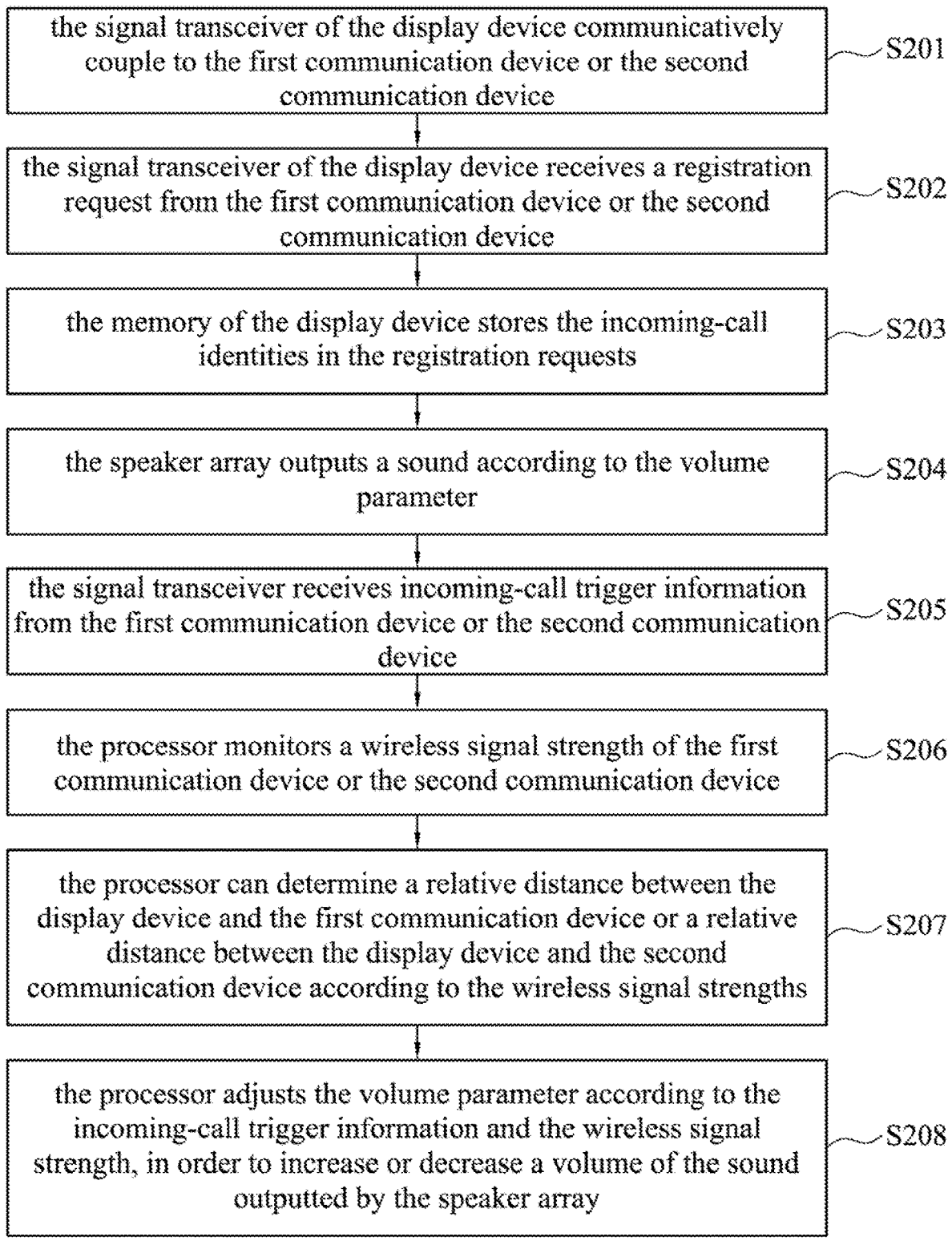
FIG. 2 is a flow chart showing a display device operating method according to an embodiment of present disclosure.

FIG. 2 is a flow chart showing a display device operating method according to one embodiment of present disclosure. It is noted that, in the embodiment, the display device operating method includes steps S201-S208. In some embodiments, the display device 100 shown in FIG. 1 can perform said steps S201-S208 so the embodiment of FIG. 1 can be referenced. In the embodiments, the steps of the display device operating method will be explained in the paragraphs below.

Step S201: the signal transceiver 120 of the display device 100 communicatively couple to the first communication device 200 or the second communication device 300. As shown in FIG. 1 and FIG. 2, in the embodiment, the first communication device 200 is a mobile phone owned by a first user, and the second communication device 300 is another mobile phone owned by a second user. In the embodiment, the display device 100 is a television. The first communication device 200 is communicatively coupled to the display device 100 via the signal transceiver 120. The second communication device 300 is communicatively coupled to the display device 100 via the signal transceiver 120 as well.

Step S202: the signal transceiver 120 of the display device 100 receives a registration request from the first communication device 200 or the second communication device 300. As shown in FIG. 1 and FIG. 2, in the embodiment, since the first communication device 200 and the second communication device 300 are both communicatively coupled to the display device 100, the first communication device 200 and the second communication device 300 can exchange signal with the display device 100. In the embodiment, the first communication device 200 can send a first registration request to the display device 100. The first registration request is a request for associating the first communication device 200 with the display device 100. Similarly, the second communication device 300 can send a second registration request to the display device 100. The second registration request is a request for associating the second communication device 300 with the display device 100.

In the embodiment, the first registration request includes a plurality of incoming-call identities stored by the first communication device 200, such as phone numbers or names of specific persons. In addition, the first registration request can further include a plurality of volume setting values each corresponding to a specific person stored by the first communication device 200. It is noted that these volume setting values can be set as required by the first user. For example, in an embodiment, the first registration request sending from the first communication device 200 includes a first identity and a second identity. The first identity corresponds to a supervisor of the first user. The second identity corresponds to a spouse of the first user. According to the requirement of the first user, the volume setting value of the supervisor can be set to a first volume setting value, and the volume setting value of the spouse can be set to a second volume setting value. In the embodiment, according to the preference of the first user, the first volume setting value is 20% of a maximum volume, and the second volume setting value is 70% of the maximum volume. In the embodiment, when the first communication device 200 sends the first registration request to the display device 100, the signal transceiver 120 can receive the first registration request.

Correspondingly, the second registration request includes a plurality of incoming-call identities stored by the second communication device 300, such as phone numbers of specific persons. In addition, the second registration request can further include a plurality of volume setting values each corresponding to a specific person stored by the second communication device 300. Similarly, these volume setting values can be set as required by the second user. For example, in an embodiment, the second registration request sending from the second communication device 300 includes a third identity and a fourth identity. The third identity corresponds to a bother of the second user. The fourth identity corresponds to the father of the second user. According to the requirement of the second user, a third volume setting value corresponding to the third identity can be set to 60% of the maximum volume, and a fourth volume setting value corresponding to the fourth identity can be set to 40% of the maximum volume. In the embodiment, when the second communication device 300 sends the second registration request to the display device 100, the signal transceiver 120 can receive the second registration request.

It is noted that the incoming-call identities and the volume setting values in the embodiments above are for exemplary purposes without the intention of limiting the scope of present disclosure. In some embodiments, the registration requests from the first communication device 200 and the second communication device 300 can include more identities and corresponding volume setting values. Substantially, a volume setting value can be ranged from 0% to 100%. A volume setting value of 0% is the mute setting. A volume setting value of 100% is to maintain current volume. A volume setting value over 100% is to increase the volume.

Step S203: the memory 140 of the display device 100 stores the incoming-call identities in the registration requests. As shown in FIG. 1 and FIG. 2, in the embodiment, the first communication device 200 and the second communication device 300 can establish signal exchanges with the display device 100. In the embodiment, when the first communication device 200 sends the first registration request to the display device 100, the signal transceiver 120 can receive the first registration request. When the second communication device 300 sends the second registration request to the display device 100, the signal transceiver 120 can receive the second registration request. In the embodiment, the signal transceiver 120 can deliver the first registration request and the second registration request to the processor 150. The processor 150 can execute the instructions stored in the memory 140 to convert the first registration request and the second registration request to the formats that can be stored in the memory 140. After being processed by the processor 150, the incoming-call identities and the corresponding volume setting values in the first registration request and the second registration request can be stored by the memory 140.

For instance, the processor 150 can convert the first registration request and the second registration request to the storable formats to the memory 140. In this manner, the memory 140 can store the first identity, the first volume setting value, the second identity, and the second volume setting value in the first registration request. The memory 140 can store the third identity, the third volume setting value, the fourth identity, and the fourth volume setting value in the second registration request.

Step S204: the speaker array 110 outputs a sound according to the volume parameter. As shown in FIG. 1 and FIG. 2, in the embodiment, the speaker array 110 is configured to receive the audio signal from the processor 150 and convert the soundwaves according to the volume parameter from the processor 150. Then, the speaker array 110 can emit the soundwaves towards at least a specific orientation. As mentioned, at the same time, the display 130 is configured to receive the video signal from the processor 150 and display the image corresponding to the video signal. In this way, the display device 100 can present the synchronized image and soundwaves to the users.

For example, in an embodiment, the first user that owned the first communication device 200 and the second user that owned the second communication device 300 are watching a movie shown displayed on the display device 100. The first user and the second user can watch the image and listen to the soundwaves corresponding to this movie. The speaker array 110 is converting the audio signal to the soundwaves according to the volume parameter. The volume parameter is corresponding to 50% of the maximum volume of the speaker array 110.

Step S205: the signal transceiver 120 receives incoming-call trigger information from the first communication device 200 or the second communication device 300. As shown in FIG. 1 and FIG. 2, in the embodiment, the signal transceiver 120 of the display device 100 can receive incoming-call trigger information from the first communication device 200 or the second communication device 300. More specifically, when a call from a specific person with an incoming-call identity stored in the first communication device 200 or in the second communication device 300 is received, the first communication device 200 or the second communication device 300 can generate incoming-call trigger information according to that incoming-call identity. The incoming-call trigger information can be redirected to the signal transceiver 120 of the display device 100.

For instance, when a supervisor of the first user makes a call to the first communication device 200, the first communication device 200 can send the incoming-call trigger information with the first identity to the display device 100. The signal transceiver 120 can receive the incoming-call trigger information and deliver the incoming-call trigger information to the processor 150. In correspondence, when the father of the second user makes a call to the second communication device 300, the second communication device 300 can send the incoming-call trigger information with the fourth identity to the display device 100. The signal transceiver 120 can receive the incoming-call trigger information and deliver the incoming-call trigger information to the processor 150. In this manner, the processor 150 can determine who is calling the first user on the first communication device 200, or calling the second user on the second communication device 300 according to the incoming-call trigger information.

Step S206: the processor 150 monitors a wireless signal strength of the first communication device 200 or the second communication device 300. As shown FIG. 1 and FIG. 2, in the embodiment, the first communication device 200 and the second communication device 300 can use the display device 100, as a wireless base station, to establish network linking. Worked as the wireless base station, the processor 150 of the display device 100 can monitor or determine the signal strengths of the first communication device 200 and the second communication device 300 via the signal transceiver 120.

For example, when the first user and the second user are watching the movie at location near the display device 100, the first communication device 200 and the second communication device 300 can be communicatively coupled to the signal transceiver 120 of the display device 100 and access the network linking established by the display device 100. When the first communication device 200 and the second communication device 300 are positioned in a specific area adjacent to the display device 100, the first communication device 200 and the second communication device 300 can connect to the network via the display device 100. In the meantime, the processor 150 of the display device 100 may determine the first wireless signal strength of the first communication device 200 by monitoring a connection between the first communication device 200 and the signal transceiver 120. Similarly, the processor 150 may determine the second wireless signal strength of the second communication device 300 by monitoring a connection between the second communication device 300 and the signal transceiver 120.

Step S207: the processor 150 can determine a relative distance between the display device 100 and the first communication device 200 or a relative distance between the display device 100 and the second communication device 300 according to the wireless signal strengths. As shown in FIG. 1 and FIG. 2, in the embodiment, since the display device 100 is the wireless station, the display device 100 can monitor the wireless signal strengths of the first communication device 200 or the second communication device 300. Based on the first wireless signal strength of the first communication device 200 or the second wireless signal strength of the second communication device 300, the display device 100 can determine a distance between the display device 100 and the first communication device 200 or a distance between the display device 100 and the second communication device 300.

For example, in the embodiment, when the first user and the second user are watching the movie at a location near the display device 100, the first user can place the first communication device 200 and the display device 100 at a first distance from one another. At this point, the processor 150 can detect the first signal strength of the first communication device 200 to be −28 dB. The processor 150 can access some specific instructions from the memory 140 to perform a calculation, in order to obtain the first distance between the first communication device 200 and the display device 100 according to the first signal strength. In the embodiment, the second user can place the second communication device 300 and the display device 100 at a second distance from one another. At this point, the processor 150 can detect the second signal strength of the second communication device 300 to be −37 dB. Correspondingly, the processor 150 can obtain the second distance between the second communication device 300 and the display device 100 according to the second signal strength. Since the value of first signal strength is larger than the value of the second signal strength, the processor 150 can determine that the first communication device 200 is relatively closer to the display device 100.

Step S208: the processor 150 adjusts the volume parameter according to the incoming-call trigger information and the wireless signal strength, in order to increase or decrease a volume of the sound outputted by the speaker array 110. As shown in FIG. 1 and FIG. 2, in the embodiment, the display device 100 can monitor the wireless signal strengths of the first communication device 200 or the second communication device 300 continuously. When the display device 100 receives the incoming-call trigger information from the first communication device 200 or the second communication device 300, the processor 150 can determine who is calling the first communication device 200 or the second communication device 300 according to the incoming-call trigger information. The processor 150 of the display device 100 can further obtain the relative distance between the display device 100 and the first communication device 200 or the relative distance between the display device 100 and the second communication device 300). Based on the incoming-call trigger information and the relative distances, the processor 150 can access the incoming-call identities and the volume setting values from the memory 140, to adjust the volume parameter provided to the speaker array 110.

More specifically, the processor 150 can monitor the wireless signal strengths of the first communication device 200 and the second communication device 300 and determines the relative distances between the display device 100 and the first communication device 200 (or the second communication device 300) continuously. The display device 100 can further determine whether the relative distances exceed a predetermined distance threshold. If it is determined that the relative distance between the display device 100 and the first communication device 200 (or the second communication device 300) is shorter than the predetermined distance threshold, the processor 150 can adjust the volume parameter according to the volume setting values stored in the memory 140. If it is determined that the relative distance between the display device 100 and the first communication device 200 (or the second communication device 300) is longer than the predetermined distance threshold, the processor 150 can access the volume setting values stored in the memory 140. The processor 150 can then modify the volume setting values according to a difference between the relative distance and the predetermined distance threshold. The modified volume setting values can be used to adjust the volume parameter.

For instance, as mentioned, the first user and the second user are watching the movie on the display device 100 and the speaker array 110 is converting the audio signal to the soundwaves based on the volume parameter of 50% of the maximum volume. In the embodiment, the predetermined distance threshold can be 3 meter.

In one embodiment, if it is the supervisor of the first user calling, the signal transceiver 120 can receive the incoming-call trigger information from the first communication device 200. The incoming-call trigger information includes the first identity. The processor 150 can access the first volume setting value from the memory 140 according to the first identity. The processor 150 can also obtain the first distance between the first communication device 200 and the display device 100 according to the first signal strength. The processor 150 can further determine whether the first distance is shorter than the predetermined distance threshold. If the first distance is shorter than 3 meter, the processor 150 can multiply the current volume parameter with the first volume setting value. Since the first volume setting value is 20%, the processor 150 can set the volume parameter to be 10% of the maximum value (i.e. 50%*20%=10%). In this case, the volume outputted by the speaker array 110 will be significantly decreased. It would be convenient for the first user can to notice the phone ring of the first communication device 200 or to answer the phone call on the first communication device 200.

In another embodiment, if it is the brother of the second user calling, the signal transceiver 120 can receive the incoming-call trigger information from the second communication device 300. The incoming-call trigger information includes the third identity. The processor 150 can access the third volume setting value from the memory 140 according to the third identity. The processor 150 can also obtain the first distance between the second communication device 300 and the display device 100 according to the second signal strength. The processor 150 can further determine whether the second distance is shorter than the predetermined distance threshold. If the second distance is loner than 3 meter, the processor 150 can increase the third volume setting value according to a difference between the second distance and the predetermined distance threshold. The processor 150 can multiply the current volume parameter (before receiving the incoming-call trigger information) with the modified third volume setting value. For example, if the second distance is 4.5 meter, the difference between the second distance and the predetermined distance threshold is 1.5 meter. In this case, the processor 150 can increase the third volume setting value by 50% of the current volume. Since the original third volume setting value is 60% of the maximum volume, the processor 150 can modify the third volume setting value to 90% of the maximum volume. Then, the processor 150 can multiply the current volume parameter with the modified third volume setting value, which is 45% of the maximum volume. Therefore, the volume outputted by the speaker array 110 will be slightly decreased. It would be convenient for the second user can to notice the phone ring of the second communication device 300 or to answer the phone call on the second communication device 300. It is noted that, in a scenario, if there are multiple users in the same space (e.g. living room) and one of them is far from the television, the influence of the sounds from the television should be marginal to this user. Under the circumstances, if the television still decreases the volume in response to a calling to this user's communication device, it would bother other users. To prevent such problem, present disclosure provides an approach to adapt the volume of the television according to a distance between the user and the television dynamically. When the user is far from the television, the volume of the television is marginally decreased. When the user is close to the television, the volume of the television is significantly decreased. The volume of the television can be controlled until a distance between the user and the television is shorter than the predetermined distance threshold.

It is noted that the volume parameter and the volume setting values in above embodiments are for exemplary purposes but not to limit the scope of present disclosure. In some embodiments, if the processor 150 modifying the volume setting value according to the difference between the relative distance and the predetermined distance threshold makes the modified volume setting value exceeding 100%, the processor 150 can maintain the current volume parameter but not to increase the volume parameter. In some other embodiments, if the processor 150 modifying the volume setting value according to the difference between the relative distance and the predetermined distance threshold makes the modified volume setting value exceeding 100%, the processor 150 can increase the volume parameter.

It is noted that, in some embodiments, the processor 150 can keep tracking the first distance according to the first signal strength, and keep tracking the second distance according to the second signal strength. When the first communication device 200 and the second communication device 300 are moving, the first signal strength and the second signal strength can vary. The processor 150 can keep calculating the difference between the first distance and the predetermined distance threshold and keep calculating the difference between the second distance and the predetermined distance threshold correspondingly. In this manner, the processor 150 can dynamically modify the volume setting values according to the differences in order to adjust the volume parameter. The sounds outputted by the speaker array 110 can therefore adapt to the first distance and the second distance. That is to say, if the user picks up the call and moves away from the television, the display device provided by present disclosure can continuously update the volume parameter according to the distance between the user and the television so that the other users would not be influenced by the volume decreasing.

It is noted that, in some embodiments, if the first communication device 200 and the second communication device 300 send different incoming-call trigger information to the display device 100 at the same time (or one after one), the display device 100 can perform mentioned process to determine the two incoming-call identities corresponding to the first communication device 200 and the second communication device 300. The display device 100 can adjust the volume parameter according to a mixed volume setting value of these incoming-call identities and dynamically adjust the volume parameter based on the first distance and the second distance. Alternatively, in some embodiments, if the first communication device 200 and the second communication device 300 send different incoming-call trigger information to the display device 100 at the same time (or one after one), the display device 100 can perform mentioned process to determine the two incoming-call identities corresponding to the first communication device 200 and the second communication device 300. The display device 100 can select a smaller one from the volume setting values corresponding to the two incoming-call identities and dynamically adjust the volume parameter based on the first distance and the second distance.

Moreover, in some embodiments, the first registration request sending from the first communication device 200 or the second registration request sending from the second communication device 300 can include a predetermined volume setting value for unknown identities, the memory 140 can store the predetermined volume setting value. If the incoming-call trigger information sending from the first communication device 200 or the second communication device 300 includes identities failing to match any volume setting values, the processor 150 can adjust the volume parameter according to the predetermined volume setting value. In this case, if the first communication device 200 or the second communication device 300 receives calls from unknown identities, the volume parameter can still be adjusted before being sent to the speaker array 110.

In view of the foregoing, when the first distance and the second distance reach the predetermined distance threshold, or when the calls to the first communication device 200 and the second communication device 300 end, the volume of the speaker array 110 will be adjusted to the original volume. That is, the speaker array 110 can get back to the volume parameter corresponding to 50% of the maximum volume then convert the audio signal to the soundwaves. In addition, to prevent a sudden increase of the volume, the speaker array 110 can gradually increase the volume of the speaker array 110 until the original volume is reached.

As described above, as the display devices in prior arts may face a conflict between volume control and user device, resulting in poor experiences to users of these display devices. In comparison, the display device of embodiments of the present disclosure can determine the identity of the incoming-call and adjust the volume of the display device according to the user's settings. The display device of embodiments of the present disclosure can further dynamically adjust the volume of the display device according to the distance between the communication device and the display device. As a result, the display device of present disclosure can provide better efficiency than the display devices in prior arts and bring better experiences to users.

Although the present disclosure has been described in considerable detail with reference to certain embodiments thereof, other embodiments are possible. Therefore, the scope of the appended claims should not be limited to the description of the embodiments contained herein. It will be apparent to those skilled in the art that various modifications and variations can be made to the structure of the present disclosure. In view of the foregoing, it is intended that the present disclosure cover modifications and variations of this disclosure provided they fall within the scope of the following claims.

What is claimed is:

1. A display device, comprising:
   at least one speaker, configured to output a sound according to a volume parameter;
   a signal transceiver, configured to receive incoming-call trigger information from a communication device, wherein there is a relative distance between the display device and the communication device;
   a processor, electrically coupled to the at least one speaker and the signal transceiver, the processor being configured to detect a wireless signal strength of the communication device via the signal transceiver and to adjust the volume parameter according to the incoming-call trigger information and the wireless signal strength, in order to adjust a volume of the sound;
   a memory, electrically coupled to the processor, wherein the signal transceiver is configured to receive at least one incoming-call identity from the communication device, wherein the at least one incoming-call identity comprises a first incoming-call identity and a second incoming-call identity, the first incoming-call identity corresponds to a first volume setting value, and the second incoming-call identity corresponds to a second volume setting value, and the processor is configured to store the at least one incoming-call identity in the memory;
   wherein:
   in response to the incoming-call trigger information comprising the first incoming-call identity and the relative distance being shorter than a predetermined distance threshold, the processor is configured to adjust the volume parameter according to the first volume setting value, thereby decreasing the volume parameter, and
   in response to the incoming-call trigger information comprising the second incoming-call identity and the relative distance being shorter than the predetermined distance threshold, the processor is configured to adjust the volume parameter according to the second volume setting value, thereby decreasing the volume parameter;
   in response to the display device receiving at the same time or one after another the incoming-call trigger information from the communication device and another incoming-call trigger information from another communication device, the processor is configured to select a smaller one from among the first volume setting value, the second volume setting value, and a third volume setting corresponding to a third incoming-call identity associated with said another incoming-call trigger information, and to adjust the volume parameter according to the selected one of the first volume setting value, the second volume setting value and the third volume setting value; and
   the signal transceiver is configured to receive said another incoming-call trigger information from said another communication device, said another incoming-call trigger information comprises the third incoming-call identity, and the processor is configured to store the third incoming-call identity in the memory.

2. The display device of claim 1, wherein the processor is configured to determine a value of the relative distance between the display device and the communication device according to the wireless signal strength.

3. The display device of claim 2, wherein
   in response to the incoming-call trigger information comprising the first incoming-call identity and the relative distance being longer than the predetermined distance threshold, the processor is configured to increase the first volume setting value according to a difference between the relative distance and the predetermined distance threshold, and to adjust the volume parameter according to the increased first volume setting value, and
   in response to the incoming-call trigger information comprising the second incoming-call identity and the relative distance being longer than the predetermined distance threshold, the processor is configured to increase the second volume setting value according to the difference between the relative distance and the predetermined distance threshold and to adjust the volume parameter according to the increased second volume setting value.

4. The display device of claim 3, wherein
   in response to a gradual increase of the difference between the relative distance and the predetermined distance threshold, the processor is configured to gradually increase the first volume setting value or the second volume setting value according to an increment of the difference, an upper limit of the first volume setting value or that of the second volume setting value is a value of the volume parameter before receiving the incoming-call trigger information.

5. A display device operating method for operating a display device that comprises at least one speaker, a signal transceiver, a processor and a memory, wherein the processor memory is configured to store at least one incoming-call identity in the memory, the at least one incoming-call identity comprises a first incoming-call identity and a second incoming-call identity, and the first incoming-call identity corresponds to a first volume setting value and the second incoming-call identity corresponds to a second volume setting value, and the method comprises:
   outputting, by the at least one speaker, a sound according to a volume parameter;
   receiving, by the signal transceiver, incoming-call trigger information from a communication device, wherein there is a relative distance between the display device and the communication device; detecting, by the processor, a wireless signal strength of the communication device;

adjusting, by the processor, the volume parameter according to the incoming-call trigger information and the wireless signal strength, in order to adjust a volume of the sound;

in response to the incoming-call trigger information comprising the first incoming-call identity and the relative distance being shorter than a predetermined distance threshold, adjusting the volume parameter according to the first volume setting value via the processor, thereby decreasing the volume parameter;

in response to the incoming-call trigger information comprising the second incoming-call identity and the relative distance being shorter than the predetermined distance threshold, adjusting the volume parameter according to the second volume setting value via the processor, thereby decreasing the volume parameter; and in response to the display device receiving at the same time or one after another the incoming-call trigger information from the communication device and another incoming-call trigger information from another communication device first incoming-call identity and the second incoming-call identity at the same time, or to the display device receiving the first incoming-call identity when the communication device sending the second incoming-call identity to the display device is being used to answer a call, selecting a smaller one from among the first volume setting value, the second volume setting value, and a third volume setting corresponding to a third incoming-call identity associated with said another incoming-call trigger information, and adjusting the volume parameter according to the selected one of the first volume setting value, the second volume setting value, and the third volume setting value;

wherein the signal transceiver is configured to receive said another incoming-call trigger information from said another communication device, said another incoming-call trigger information comprises the third incoming-call identity, and the processor is configured to store the third incoming-call identity in the memory.

6. The display device operating method of claim 5, further comprising:

determining, by the processor, a value of the relative distance between the display device and the communication device according to the wireless signal strength.

7. The display device operating method of claim 6, further comprising:

in response to the incoming-call trigger information comprising the first incoming-call identity and the relative distance being longer than the predetermined distance threshold, increasing the first volume setting value according to a difference between the relative distance and the predetermined distance threshold and adjust the volume parameter according to the increased first volume setting value via the processor, and in response to the incoming-call trigger information comprising the second incoming-call identity and the relative distance being longer than the predetermined distance threshold, increasing the second volume setting value according to the difference between the relative distance and the predetermined distance threshold and adjust the volume parameter according to the increased second volume setting value via the processor.

* * * * *